(No Model.) 4 Sheets—Sheet 1.

C. J. SKEEN.
CORN HARVESTER.

No. 534,526. Patented Feb. 19, 1895.

WITNESSES: INVENTOR
Chas. Nidy. C. J. Skeen
J. Fred. Acker BY Munn & Co
ATTORNEYS.

(No Model.) 4 Sheets—Sheet 2.
C. J. SKEEN.
CORN HARVESTER.
No. 534,526. Patented Feb. 19, 1895.
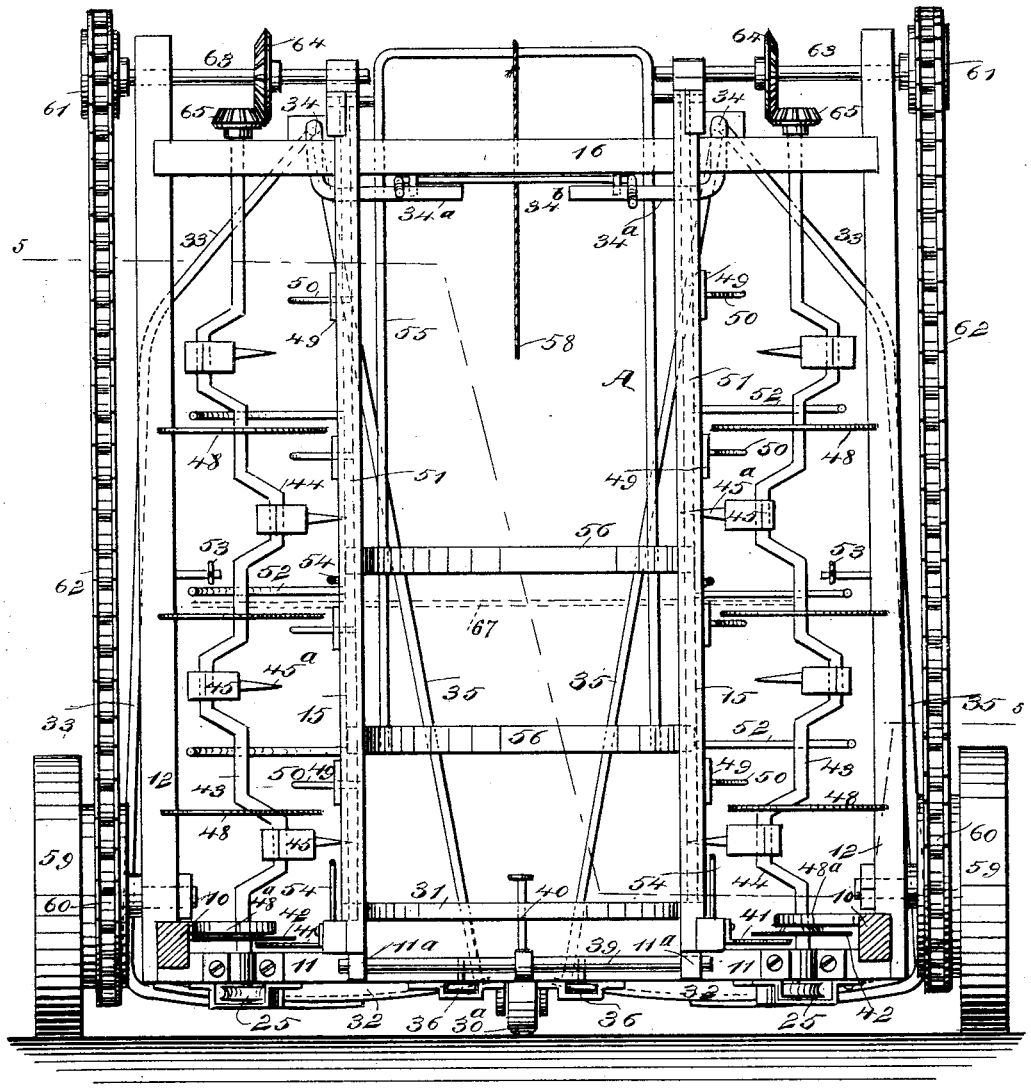
WITNESSES:
Chas. Nida
J. Fred. Acker
INVENTOR
C. J. Skeen
BY
Munn & Co
ATTORNEYS.

(No Model.) 4 Sheets—Sheet 3.
C. J. SKEEN.
CORN HARVESTER.
No. 534,526. Patented Feb. 19, 1895.
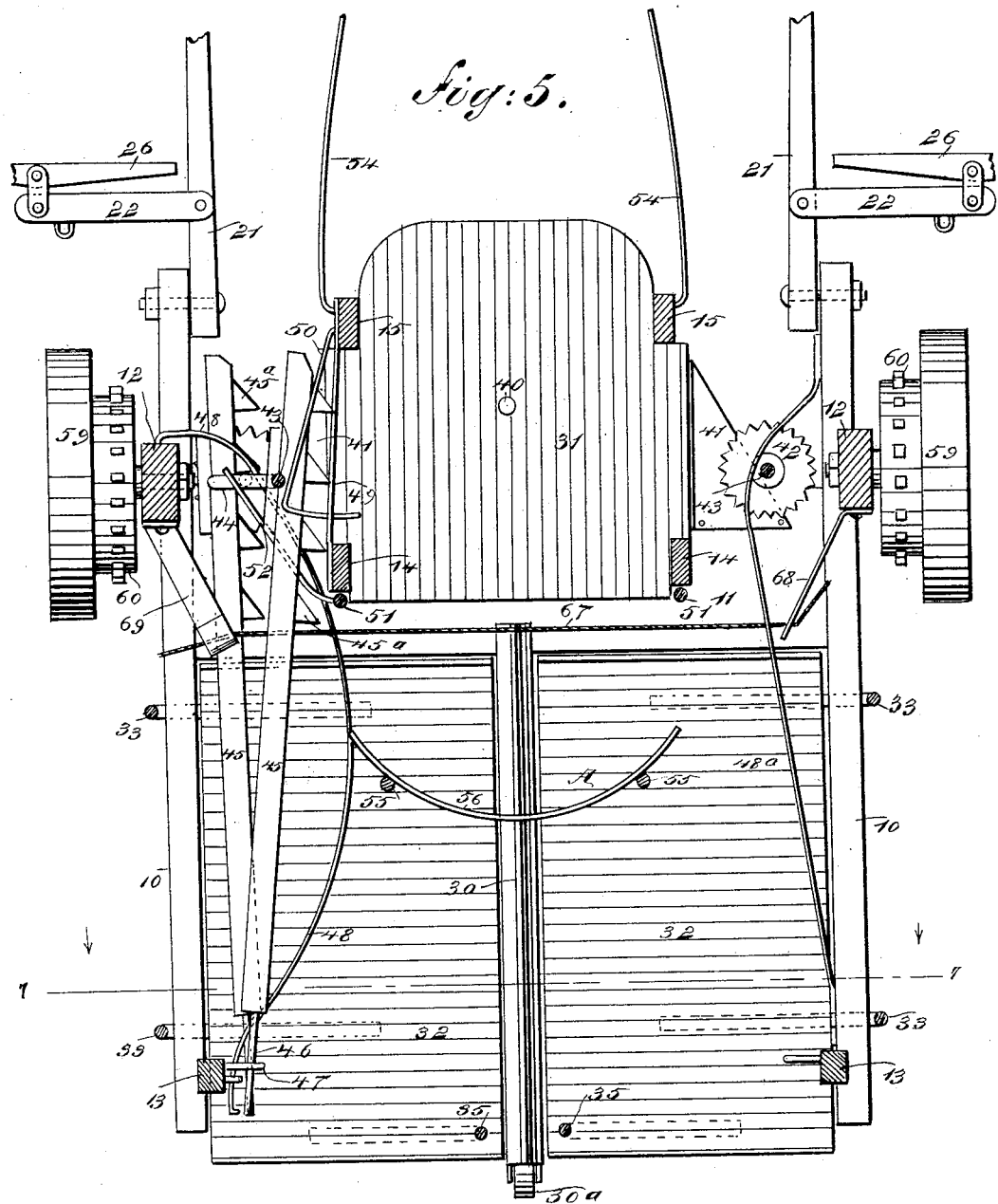
WITNESSES:
INVENTOR
C. J. Skeen
BY Munn & Co
ATTORNEYS.

(No Model.) 4 Sheets—Sheet 4.
C. J. SKEEN.
CORN HARVESTER.
No. 534,526. Patented Feb. 19, 1895.
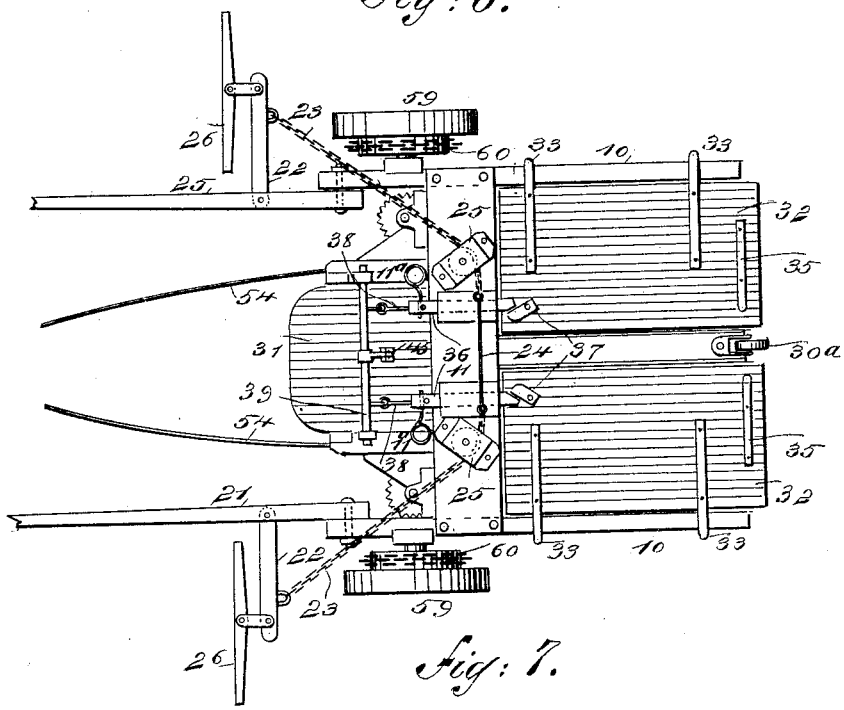
Fig: 6.
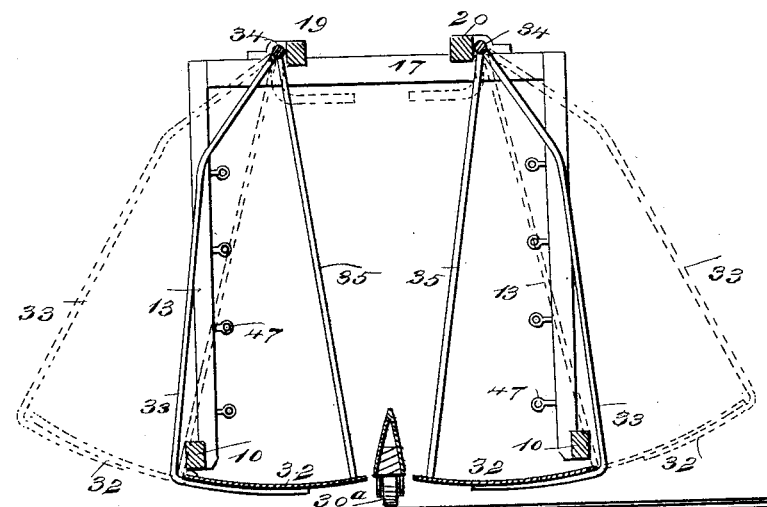
Fig: 7.
WITNESSES:
Chas. Nida.
Fred Acker
INVENTOR
C. J. Skeen
BY
Munn & Co
ATTORNEYS.

UNITED STATES PATENT OFFICE.

CHRISTEN JENSEN SKEEN, OF VIBORG, SOUTH DAKOTA.

CORN-HARVESTER.

SPECIFICATION forming part of Letters Patent No. 534,526, dated February 19, 1895.

Application filed June 9, 1894. Serial No. 513,992. (No model.)

*To all whom it may concern:*

Be it known that I, CHRISTEN JENSEN SKEEN, of Viborg, in the county of Turner and State of South Dakota, have invented a new and Improved Corn-Harvester, of which the following is a full, clear, and exact description.

My invention relates to an improvement in corn harvesters, and it has for its object to provide a machine capable of harvesting at one time two rows of corn, and of shocking the corn in the machine as the stalks are cut.

Another object of the invention is to so construct the machine that two shocks will be simultaneously formed therein, and whereby the shocks of corn will be held in an upright position until they have acquired a proper size, at which time the platforms upon which they stand may be drawn from beneath them, the trip mechanism being operated from the driver's seat, and the shocks be guided to the ground, and whereby as the machine is further advanced it will leave the shocks in a standing position.

Another object of the invention is to provide a corn harvester which will be light, durable and economic, and in connection with which a binder of any description, whether automatic or hand manipulated, may be employed.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
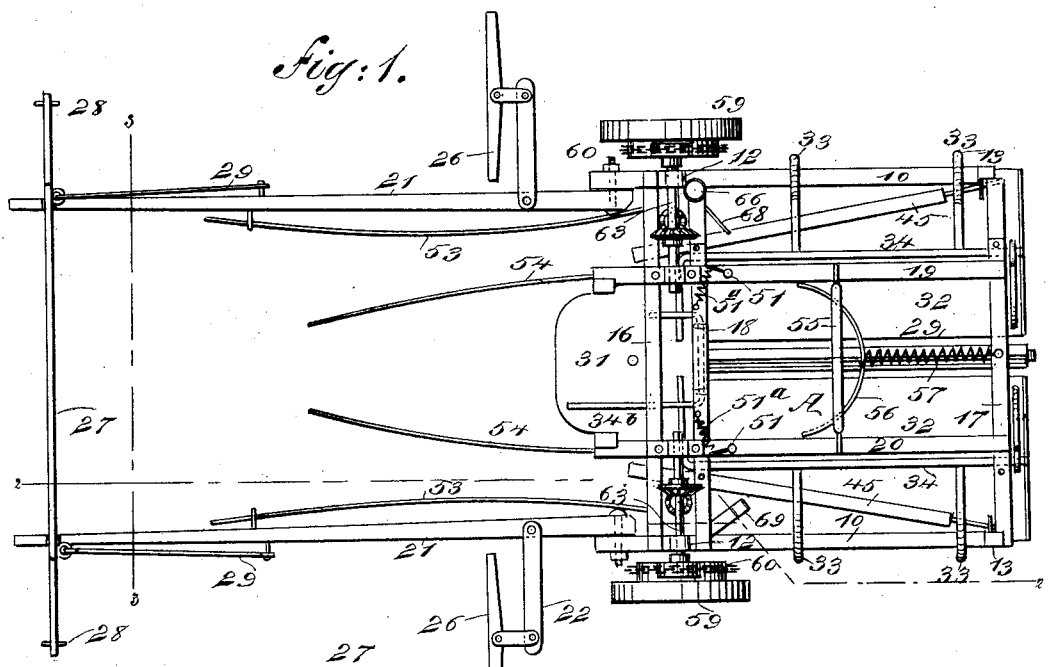
Figures 2, 3:
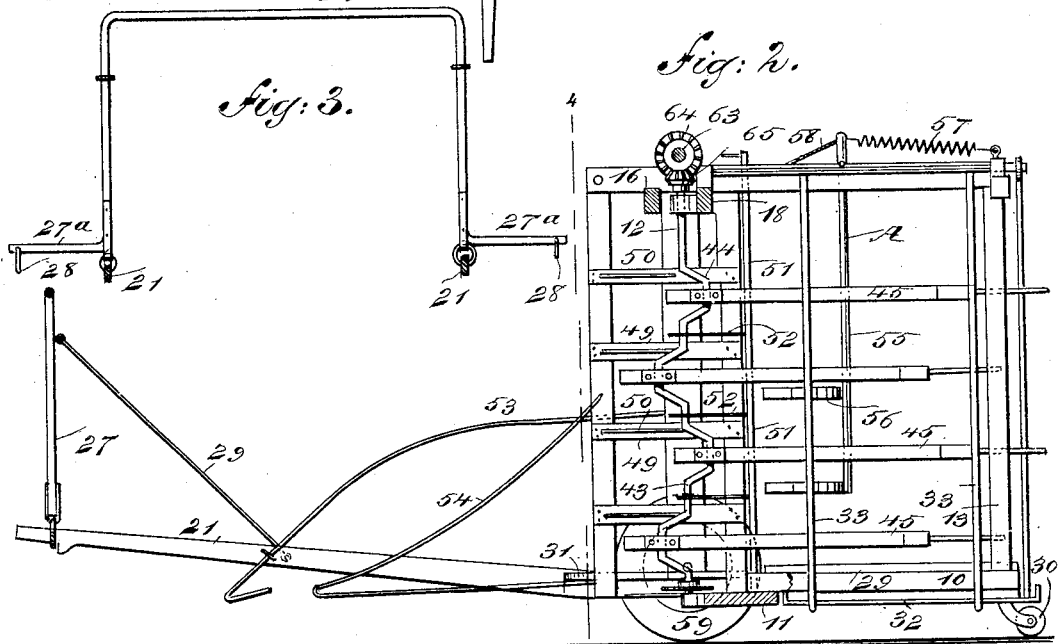

Figure 1 is a plan view of the machine. Fig. 2 is a longitudinal vertical section taken substantially on the line 2—2 of Fig. 1. Fig. 3 is a transverse section through the poles of the machine, illustrating the yoke connecting the poles in elevation, the section being taken on the line 3—3 of Fig. 1. Fig. 4 is a vertical section taken through the poles close to the body of the machine, practically on the line 4—4 of Fig. 2, the said body being in front elevation. Fig. 5 is a horizontal section through the body of the machine, taken substantially on the line 5—5 of Fig. 4. Fig. 6 is a bottom plan view of the machine; and Fig. 7 is a transverse vertical section, taken essentially on the line 7—7 of Fig. 5.

In carrying out the invention the frame consists preferably of two side beams 10, connected near the front by a wide cross bar 11, said cross bar, as shown in Fig. 6, being provided with forward extensions 11$^a$ at each side of its center. Standards 12, are projected upward from the side beams 10 near the front of the machine; a rear set of standards 13, is projected upward also from the said side beams near their rear ends; a third set of standards is projected upward from the cross bar 11, one being located at each side of the center, and a fourth and extreme forward set of standards 15, in alignment with the side standards 14, is projected upward, one from the outer extremity of each cross bar extension 11$^a$.

An upper cross bar 16, is made to extend along the front face of both of the main standards 12; a rear upper cross bar 17, connects the rear uprights or standards 13, while a third cross bar 18 is carried from one of the main standards 12 to the other along the rear sides thereof, as shown in Fig. 1.

The frame may be said to be completed by the addition of two longitudinal tie beams 19 and 20, which extend from the rear cross bar 17, one at each side of its center and connect with the cross bars attached to the main standards 12, and they are also attached to the forward standards 15, it being understood that the cross bar 18 is also attached to the upper end of the standards 14. The standards 14 and 15 form as it were a frame within the main frame.

A pole 21, is pivotally attached to the forward end of each beam 10 of the main frame, and an equalizing bar 22, is pivoted upon each pole, and is made to extend outwardly at a right angle thereto; and each equalizing bar has attached to its rear edge a length of chain 23, the two chains being connected by a link 24 or the equivalent thereof, and the chains are made to pass over rollers 25 located upon the bottom of the lower cross bar 11 of the main frame, as illustrated in Fig. 6, the singletrees 26 being connected with the outer ends of the equalizing bars 22. The space between the two poles is sufficient to receive two rows of corn, one row being adjacent to the inner face of each pole.

A yoke 27, is made to connect the two poles near their forward ends, as shown in Fig. 2, and the said yoke is provided with arms 27ª, which extend horizontally outward, one from each pole, the arms being provided with links 28 for engagement with the harness of the team; and the yoke is held in an upright position through the medium of links 29, connected with its upright portion and with the poles.

The space back of the cross bar 11 is divided longitudinally into two sections through the medium of a partition 30, which is provided with downwardly inclined sides whereby the said partition is somewhat inverted V-shape in cross section, as shown in Fig. 7. This partition is secured in any suitable and approved manner to the cross bar 11, and extends some distance above the same; and the rear end of this partition is supported by a caster wheel 30ª. A platform 31, is supported in the auxiliary or inner frame, comprising the standards 14 and 15, and upon this platform the driver's seat is located, or an operator may stand on said platform. The space at each side of the partition 30 is normally closed by a platform 32, and each of these platforms has attached to it at its outer edge two arms 33, located one near each end, which arms extend below the side beam of the main frame upward and inward to an engagement with rock shafts 34, one of which is journaled upon the upper portion of the main frame near each of the longitudinal beams 19 and 20, as shown in Fig. 7. The inner supporting bar 35 is attached to the inner rear portion of each platform 32, and is carried upward to a connection with the rear end of the rock shaft 34 supporting the platform, and as illustrated in Figs. 4 and 7, the platforms are formed with more or less of a concaved upper face.

Each rock shaft is provided at its forward end with a crank arm 34ª, the crank arms being made to extend transversely in direction of each other over the platform 31, as shown in Fig. 4, and the rock shafts are operated simultaneously by a substantially U trip bar 34ᵇ, fulcrumed, for example on the upper cross bar 18, one member of the said trip bar extending over each crank arm 34ª, and one of the members is sufficiently long to permit a rope or chain to be attached thereto and led downward to the driver, whereupon by drawing downward upon this rope or chain both platforms 32 will be carried outward in opposite directions, and any material that may be contained thereon will be dropped to the surface over which the machine is passing. The outer position of the movable platform is indicated in dotted lines in Fig. 7.

The movable platforms 32 are prevented from moving outward, or uncovering the space within the frame, through the medium of spring-controlled latches 36, held to slide in suitable guides upon the bottom of the cross bar 11. These latches engage with stops 37, formed upon the bottom of the said movable platforms, as illustrated in Fig. 6. The latches are connected by links 38 with a rock shaft 39, journaled beneath the driver's platform 31, the rock shaft being operated through the medium of a foot lever 40, extending upward through said platform within convenient reach of the driver's foot. Thus by pressing downward upon this lever the bolts will be withdrawn from the stops of the movable platforms, and by operating the rock shafts 34 the platforms may be carried to their outer position. The stops are rounded off at their inner ends, and the bolts are preferably more or less beveled, so that when downward tension is removed from the trip bar 34ᵇ, and the movable platforms return to their normal position through gravity, they will automatically lock themselves in engagement with the latches or bolts.

Two cutters 41 and 42 are employed, located one at each side of the center of the machine. The cutters 41, are fixed cutters, and are of substantially triangular shape, being secured upon the forward edge of the lower cross bar 11, the inclined surfaces facing the side bars of the main frame and their opposite straight surfaces being carried to an engagement with the inner auxiliary frame, as is best shown in Fig. 5. The cutters 42, are saw cutters, and each is mounted upon a crank shaft 43 in such manner that the said saw cutters will rotate with about half their diameters over the inclined or cutting edges of the fixed cutters 41, as shown at the right in Fig. 5. Each crank shaft 43 is journaled at its lower end in suitable bearings located upon the forward edge of the front lower cross bar 11, and in bearings formed preferably upon the upper cross bar 18.

The shafts may be provided with any desired number of crank arms 44, and the arms of each shaft are located at angles to one another. Each crank arm is pivotally connected with a feed or gathering bar 45, the said bars being made to extend a sufficient distance beyond the front of the crank shafts to be located over and extend beyond the rotary cutters 42, as shown at the left in Fig. 5; and the forward edge of each gathering or feed bar 45, is provided with teeth 45ª, the forward surfaces of which are inclined, and the rear surfaces straight. These gathering bars are provided with spindles or pins 46 at their rear ends, which are made to slide in eyes 47 or their equivalents, located upon the inner faces of the rear standards 13 of the main frame. The gathering bars serve to feed the corn stalks to the cutters and carry the cut stalks backward upon the movable platforms 32.

Spring guides preferably made of wire or equivalent material, are attached to the forward ends of the main standards 12, and are carried in a bow shape rearward in front of the crank shafts, the said spring guides having free movement at their rear ends in eyes formed upon the said rear standards 13, as is likewise shown in Fig. 5. These spring guides 48, commence a predetermined distance above the cutters, but a single guide 48ª of a spring character, preferably rectangular in cross section and of heavier material than the upper guides, is secured to the forward edge of each side beam 10, and is passed in bow shape rearward over the rotary and stationary cutters, and around the crank shafts to a secure engagement with the rear portion of the side beams, as illustrated at the right in Fig. 5, these heavy springs being adapted to guide the butts of the stalks in their rearward travel.

Slats 49, are located at intervals upon the outer side surfaces of the standards 14 and 15 of the auxiliary frame connecting the said standards, as illustrated in Figs. 2 and 5. Each slat is provided at its outer face with a spring guide 50, the spring being substantially that which is known usually as an umbrella bow spring, the said spring having free movement at its wider and rear end, since the outer faces of the springs are given a rearward and outward inclination. These springs serve to somewhat retard the corn stalks while being cut, and maintain the stalks in an upright position.

At the back of each standard 14 of the auxiliary frame a vertical shaft 51 is fulcrumed in the cross bar 11 and in bearings located upon the beams 19 and 20. Each of these shafts is provided with a series of arms 52, which are normally held substantially in engagement with the crank shafts, as is shown in Figs. 2 and 5, through the medium of springs 51ª attached to the upper ends of the shafts, as illustrated in Fig. 1 so that the said arms may yield to allow the stalks to pass between the shafts 51 and the guides 48ª and 48, the latter being likewise yielding as described.

Outer or forward guides 53 are secured to the main standards 12 about mid-way between their ends, and have free movement at their forward ends in eyes formed upon the inner faces of the poles 21, these upper guides serving to direct the corn stalks in proper manner to the cutters; and a pilot 54, is secured to and projects forwardly from each forward standard 15, the said pilot being adapted to raise the fallen stalks and direct them to the cutters.

A cradle A, is pivoted in the main frame over the movable platforms 32, and the partition 30 between said platforms. This cradle consists of a yoke-like frame 55, fulcrumed preferably in the top longitudinal bars 19 and 20 of the frame to swing longitudinally thereof, as shown in Figs. 1 and 4, and a series of rearwardly curved horizontally located bars 56, placed at predetermined intervals apart and secured to said frame, the bars being of such length that they extend well over each platfoom 32. The cradle may be elevated in a rearwardly direction by attaching a cord 58 to the upper portion of the bow frame, and leading the same down convenient to the driver. A spring, 57, serves to restore the cradle to its normal position.

The main frame is supported by two ground wheels 59, located upon spud axles, which are usually projected from the lower portion of the main standards 12. Each of the ground wheels has attached to its inner face a sprocket wheel 60, the sprocket wheels being connected by belts 62 with pinions 61, secured upon shafts 63, the said shafts being journaled at the upper forward portion of the machine, one at each side of the center. Each shaft 63, is provided with a beveled gear 64, which meshes with a pinion 65 located upon one of the crank shafts 43.

The binding cord 67 is located in a cup or holder 66, as shown in Fig. 1, and supported at one side of the machine upon one of the forward cross bars. The twine is led from this holder through a guide arm 68, secured to one of the standards 12, and longitudinally across the lower cross bar 11 to an engagement with a clip 69 at the opposite side of the machine. The cradle A is held normally either in a vertical position, or with a slight forward inclination through the medium of the spring 57 attached to its upper end and to a convenient fixed support.

In the operation of this machine, as the machine is drawn forward the corn stalks of two rows will be received by the two sets of cutters and will be severed quite close to the ground. The feed bars which are given a laterally reciprocating and somewhat rocking movement through the medium of the crank shafts, carry the cut stalks rearward upon the movable platforms 32, the spring guides yielding so as to allow the stalks to pass on the outside of the shafts 51, and also serving to maintain the stalks in an upright position, assisted by the horizontal arms carried by the shafts 51. As the stalks are rearwardly fed they will swing the cradle backward, the rearward position of the cradle being controlled by the growth of the shock, since the corn will be built up in two shocks, one upon each platform.

When a sufficient quantity of corn has been received upon the platforms it is tied or bound with the cord 67, which is accomplished by simply drawing the ends of the cord together and tying them, since the corn stalks, as rearwardly fed, will carry backward with them the cord which is stretched across the cross bar 11, the cord unrolling from its box or cup 66. The cradle is then elevated by drawing downward upon the cord 58, the movable platforms are released from the latches 36 by pressing downward upon the foot lever 40, and the U trip bar 34ᵇ is finally manipulated to rock the shafts 34 and carry the platforms to their outer position, dumping the shocks in a standing position upon the ground. As the machine is drawn farther forward the cradle will pass over the top of the shocks, leaving them in their standing position, and the parts are then permitted to assume their normal position, and the process of cutting is further continued.

Having thus described my invention, I claim as new and desire to secure by Letters Patent—

1. A corn harvester, provided with a receiving chamber for the cut corn, stalk passages at the sides of the frame and guide mechanism for forcing the cut stalks inwardly into the receiving chamber, and a cradle held centrally over the said chamber and to swing longitudinally rearward and upward, so as to ride over the shock, all arranged substantially as shown and for the purposes described.

2. A corn harvester having at the front a central chamber like portion, stalk passages at each side thereof, cutting mechanism at the lower end thereof, a central receiving chamber at the rear of the machine extended entirely across the same, spring guide members for forcing the cut stalks into the rear chamber as they leave the side passages, and a cradle pivoted at the upper end of the frame, spring pressed to its lower-most position, said cradle having a member forming a rear abutment for the shock as it is formed in the rear chamber, and means for swinging the said cradle upward and rearward, substantially as shown and for the purpose described.

3. In a corn harvesting machine as described, the combination with the main frame, the driver's central front space, the stalk passages, and the cutting and feeding mechanism, of rock shafts journaled longitudinally on the upper portion of the frame, having crank members extended over the driver space, said rock shafts having pendent members extended down over the sides of the main frame, platform members secured thereto, arranged to open from the center outward and projected under the shock forming portion of the machine, latch mechanism for holding the platforms to their closed position having releasing devices adapted to be operated by the driver, and means for operating the crank members of the rock shafts in unison, all arranged substantially as and for the purposes set forth.

4. A corn harvester, having cutting mechanisms, stalk passages, and feed devices at the opposite sides of the main frame, and a receiving chamber common to both passages, and a cradle having horizontal members forming abutments for the stalks as they are fed into the receiving chamber, said cradle having a pivotal support at the upper end and a spring for normally holding it to its pendent position, and an operating cord or chain extended within reach of the driver connected with the said cradle for swinging it upward and rearward, as specified.

CHRIS. JENSEN SKEEN.

Witnesses:
J. C. NIELSEN,
W. C. SARSON.